Patented June 24, 1947

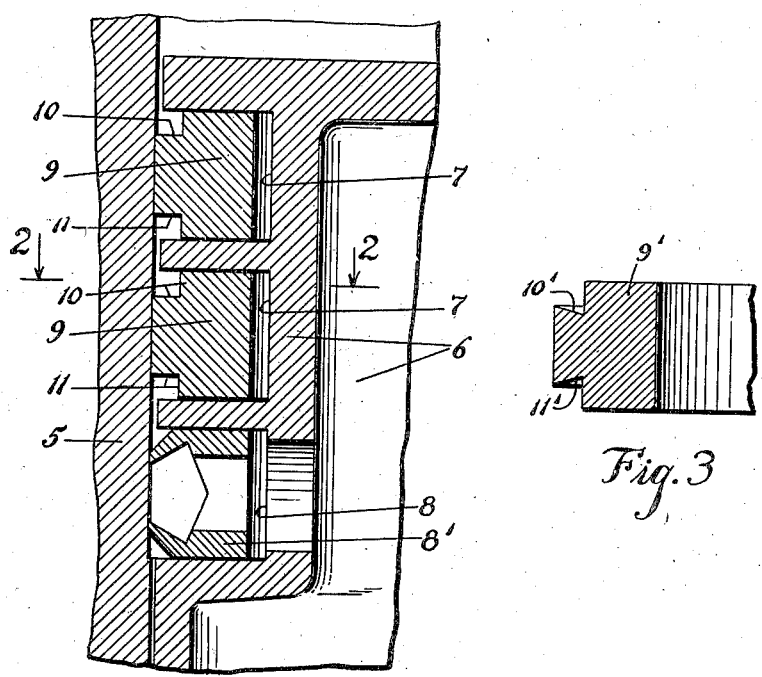
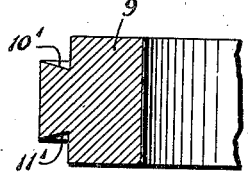
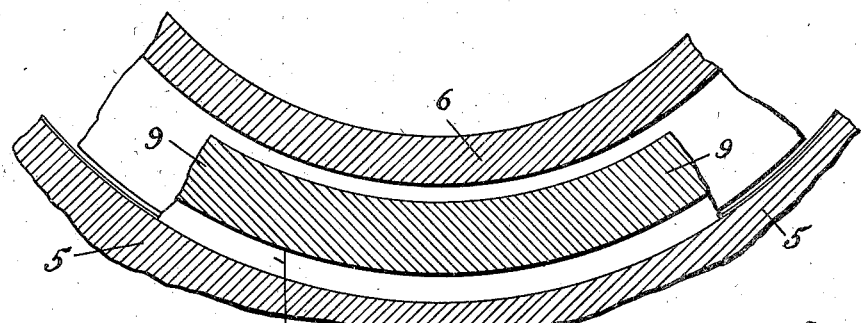

2,423,017

UNITED STATES PATENT OFFICE 2,423,017

PISTON RING

Gerald M. M. Grant, Los Angeles, Calif.

Application July 16, 1945, Serial No. 605,241

2 Claims. (Cl. 309—45)

This invention relates to piston rings, and more particularly to certain improvements in the construction of piston rings whereby greater efficiency in sealing compression is had because of a new structural feature of the wall-engaging face of said ring.

Heretofore it has been common to provide a piston ring with a sharp square wall-engaging face either for the full depth of the ring body, or with the bottom corner only cut away, which unbalanced the ring and caused it to have a certain amount of torsion, and this permitted leakage of compression and also of oil.

I have conceived the idea of providing the wall-engaging face of a piston or compression ring with a uniformly reduced face by cutting an annular pocket or groove in its upper and lower outer corners, thus leaving a wall-engaging face of less height than the height of the body which fits the piston groove. This results in two very important functions, namely, the ring will not twist or cup in the ring grooves, and it also provides two oil retaining pockets or grooves at the upper and lower outer corners of the ring, which oil functions in a better sealing for compression, without allowing the oil to be forced between the top of the ring and the top wall of the piston ring groove, but retains it in said grooves or recesses, where it also lubricates the cylinder wall and causes a more perfect sealing between the ring and the cylinder wall.

Other objects and advantages will appear from the following more detailed description of my invention, taken with the accompanying sheet of drawings, in which Figure 1 is a fragmentary, sectional view, through a part of a cylinder wall and piston, with piston ring grooves, and with piston rings embodying my invention shown therein in section;

Figure 2 is a horizontal sectional view taken on line 2—2 of Fig. 1; and

Figure 3 shows a slightly modified form of the wall-engaging face of a piston ring embodying my invention.

Referring in detail to the drawings, a fragmentary portion of a cylinder wall is shown and designated 5, with a fragmentary part of a piston 6 in position relative thereto, said piston having the usual piston ring grooves 7, 7, and an oil ring groove 8, with my improved oil ring 8' shown therein and which forms the subject matter of another application, and need not be more fully referred to here.

My invention as here presented constitutes a piston ring body 9, adapted to fit the piston ring groove 7, as indicated, and having its wall-engaging face reduced uniformly at top and bottom, which results in providing two annular grooves or annular channels 10 and 11 above and below the wall-engaging face of said ring, as clearly shown.

In Fig. 3, I have indicated how these grooves or channels can be tapered somewhat with an acute angle instead of a right angle, as at 10' and 11' in a ring designated 9'.

By forming the ring with the two annular channels 10 and 11, at the upper and lower front corners of the ring, the wall-engaging face of the ring is reduced accordingly, but the ring is balanced and will not twist or cup in operation because of more metal at one corner, as is the case where there is only one groove or channel in one corner of the ring.

Then again, the oil gathered from the cylinder wall in the channel 10 on the upward movement of the piston will remain in the channel and on compression helps to a more perfect sealing between the face of the ring and the wall of the cylinder, and the oil, being in the bottom of said channel 10 cannot be forced inwardly between the top of the ring body 9 and the top of the ring groove 7 on compression or explosion.

On the up stroke, the upper corners of the piston rings 9, 9, will naturally gather any surplus oil on the cylinder wall into the grooves 10, 10, and then on the explosion or compression stroke, said oil will have a certain sealing effect between the wall-engaging face of the ring and the wall of the cylinder. On the down stroke, the lower corners of said piston ring will naturally push any surplus oil on the cylinder wall downwardly, from one groove to the next one below, as will be clear from the showing made in Fig. 1.

It will be noted also, that these piston rings are reversible and that there can be no mistake in inserting them into the ring grooves, thus greatly facilitating the labor of installing a set of piston rings, and also the oil ring shown in the lower groove, and described in another application.

I do not limit the invention to the exact details here shown and described, except as I may be limited by the hereto appended claims.

I claim:

1. A compression piston ring having a body to fit a piston ring groove and having its wall-engaging face reduced with continuous and uninterrupted rectangular annular channels in its upper and lower corners, not to exceed $35/1000$ of an inch in depth from the periphery of the ring, to retain oil therein for sealing purposes on the compression stroke.

2. A piston ring having a body to fit a piston groove and having its wall-engaging face uniformly reduced by cutting away the upper and lower wall-engaging corners to form continuous and uninterrupted rectangular annular oil retaining channels therein, not to exceed $35/1000$ of an inch in depth inwardly from the periphery of the ring, whereby to confine films of oil therein for sealing purposes.

GERALD M. M. GRANT.

REFERENCES CITED

The following references are of record in the file of this patent:

UNITED STATES PATENTS

| Number | Name | Date |
|---|---|---|
| 1,560,307 | Peeler | Nov. 3, 1925 |
| 1,702,294 | Du Bois | Feb. 19, 1929 |
| 1,440,895 | Rymer | Jan. 2, 1923 |
| 1,298,548 | Mummert et al. | Mar. 25, 1919 |
| 1,346,806 | Bloom | July 20, 1920 |
| 1,932,737 | Johnson | Oct. 31, 1933 |

FOREIGN PATENTS

| Number | Country | Date |
|---|---|---|
| 178,306 | Great Britain | Apr. 20, 1922 |
| 6,905 | Great Britain | Apr. 1, 1905 |